S. Newman.
Sawing Staves.

N° 97,310.   Patented Nov. 30, 1869.

Witnesses;

Inventor;
Samuel Newman

United States Patent Office.

SAMUEL NEWMAN, OF CLEVELAND, OHIO, ASSIGNOR TO HIMSELF AND JOHN NEWMAN.

Letters Patent No. 97,310, dated November 30, 1869.

IMPROVEMENT IN STAVE-MACHINES.

The Schedule referred to in these Letters Patent and making part of the same.

*To all whom it may concern:*

Be it known that I, SAMUEL NEWMAN, of Cleveland, in the county of Cuyahoga, and State of Ohio, have invented certain new and useful Improvements in Stave-Sawing Machines; and I do hereby declare that the following is a full and complete description of the same, reference being had to the accompanying drawings, making part of this specification, in which—

Figure 1:
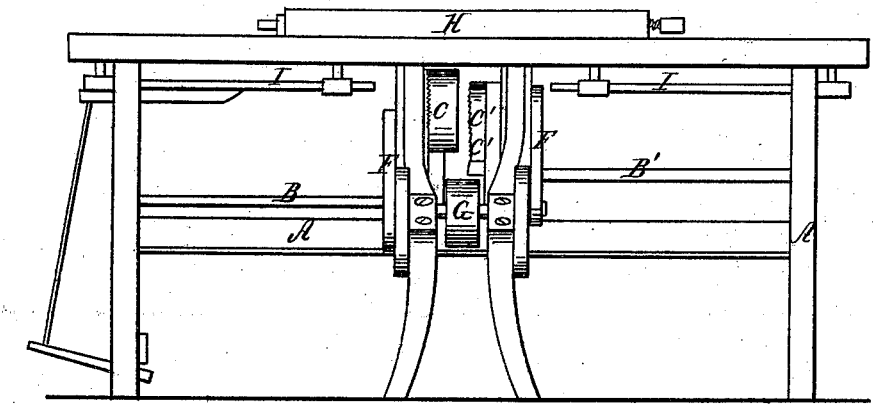

Figure 1 is a side view of the machine.

Figure 2:
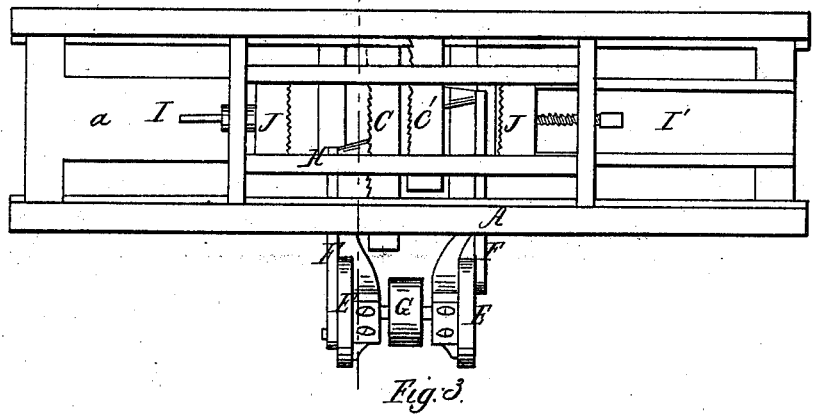

Figure 2, a top view.

Figure 3:
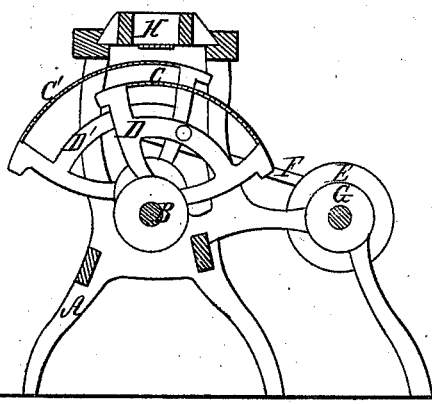

Figure 3, a transverse section, in direction of line $xx$.

Like letters refer to like parts in the different views presented.

The nature of this invention relates to a machine for sawing staves, by means of segment saws so arranged and operated that they have a reciprocating curvilineal motion, as hereinafter described.

In fig. 1, A represents an oblong square frame, in which are hung on the shafts B B' the curvilineal saws C C', said saws being secured to the stays D D', as shown in fig. 3.

The stays and saws are connected to the crank-wheels E, by means of the links F, whereby they are operated, said wheels being driven by any power that may be used, the same being applied by means of the pulley G.

H is a carriage, fitted to the upper side of the frame, in angular grooves, as shown in fig. 3, and in which it slides backward and forward in the frame, as will hereinafter be shown.

It will be observed that the saw C' is elevated above the saw C, the distance being equal to the thickness of the stave.

It will also be seen that the saw C is elevated above the table I, equal to the thickness of a stave.

By this arrangement of the saws, two staves can be sawn at once, in the manner as follows:

The bolt from which the stave are to be sawn is placed in the carriage, between the dogs J, fig. 2, upon the table I.

The carriage or bolt is adjusted at the end of the frame, at $a$, in front of the saws, which, on being started, the carriage is then pushed forward, bringing the lower side and end of the bolt in contact with them, the saw C cutting off a stave from the lower side of the bolt, and the saw C' cutting a stave immediately above it, the first stave passing under saw C, and the second one between the two saws.

By this means two staves are cut at once, or by one passage of the carriage over the saws, the staves falling off on the table I'.

It will be seen that the action of the saws is reciprocal, each moving in the arc of a circle, said circle being equal to the circumference of the barrels for which the staves are intended. Thus, two staves are cut at once, and of equal curvature, the vibration of the saws being equal.

It will also be seen that the movement of the saws is alternating relatively to each other, thereby a more equal and steady motion is obtained to them than if they both moved at once in the same direction, and that the teeth of each saw do not all rake in the same direction from one and to the other, but from the centre of the saw they rake in opposite directions, thereby giving to the saws a facility for cutting both ways.

This machine is simple in its construction and operation, and performs its work with less power than the stave-machine in ordinary use.

It is also much less expensive, and requires but little practical experience to operate it.

It will be obvious that this machine can be run with one saw only, and though thus reducing its capacity for sawing, does not in any way affect the principle of its operation.

What I claim as my improvement, and desire to secure by Letters Patent, is—

A stave-sawing machine, having alternating segmental saws C C', frame H, dogs J, sliding tables I I', and frame A, all the parts being constructed and arranged in the manner substantially as described, and for the purpose set forth.

SAMUEL NEWMAN.

Witnesses:
  J. H. BURRIDGE,
  E. E. WAITE.